Oct. 9, 1951          H. VANTINE, JR          2,570,295
PARACHUTE SAFETY OPENER
Filed April 27, 1948          2 Sheets-Sheet 1
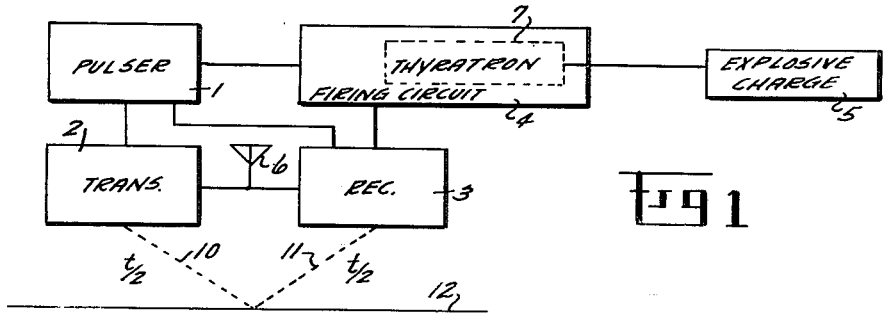
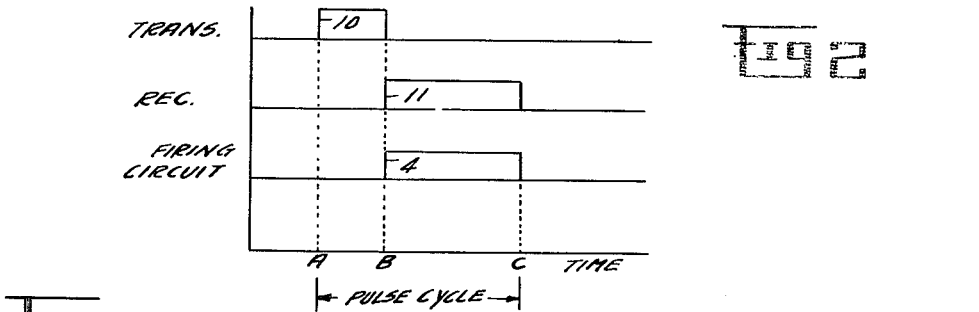
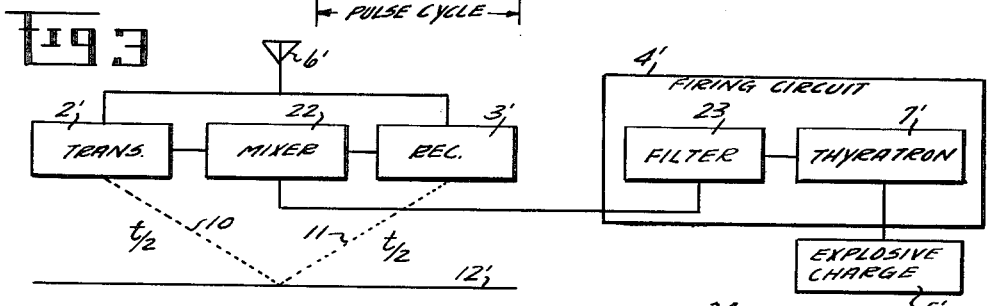
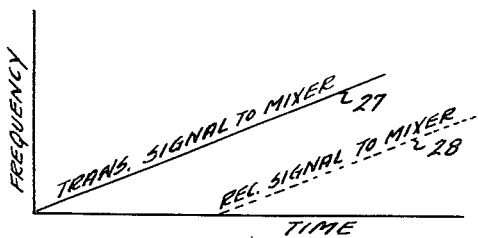
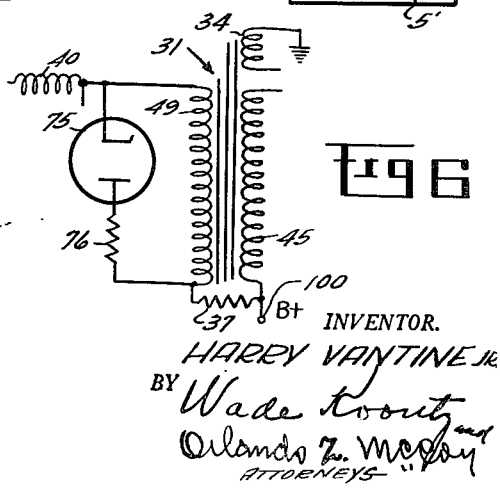
INVENTOR.
HARRY VANTINE JR.
BY Wade Krout and Orlando T. McCoy
ATTORNEYS

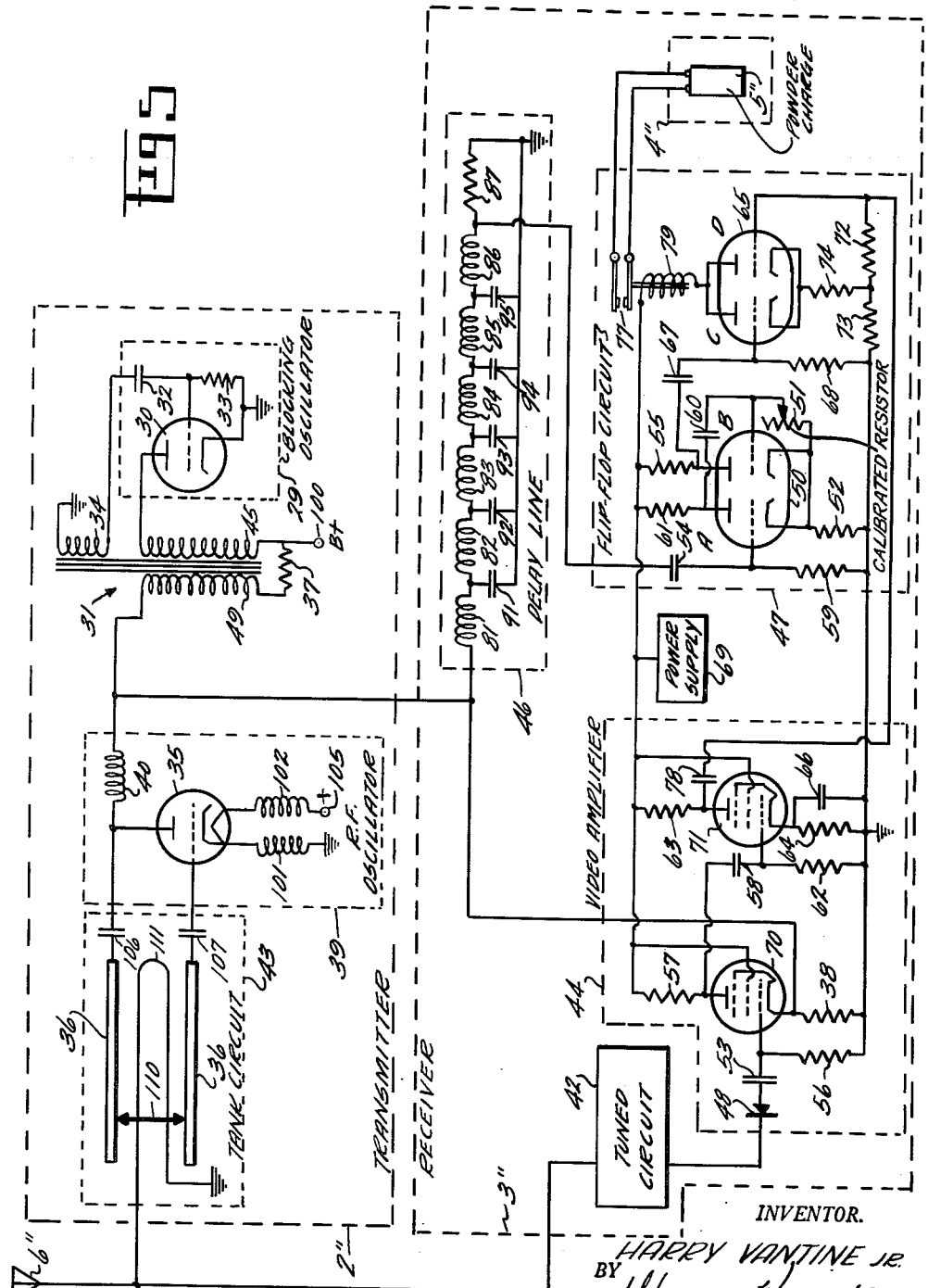

Patented Oct. 9, 1951

2,570,295

UNITED STATES PATENT OFFICE 2,570,295

PARACHUTE SAFETY OPENER

Harry Vantine, Jr., Dayton, Ohio

Application April 27, 1948, Serial No. 23,611

5 Claims. (Cl. 343—13)

(Granted under the act of March 3, 1883, as amended April 30, 1928; 370 O. G. 757)

The invention described herein may be manufactured and used by or for the Government for governmental purposes without payment to me of any royalty thereon.

This invention pertains to parachute equipment and more particularly to an electronically actuated parachute opener that operates at a predetermined distance above the ground independently of barometric pressure.

At the present time, automatic parachute opening devices are commonly operated upon the principle of relative barometric pressures with respect to which the present invention is structurally, functionally and operatively in no way either related or dependent. In a barometrically operated automatic parachute opener, the parachute is opened at a predetermined barometric pressure. This does not take into account the proximity of the ground at the time the parachute is released or opened, nor does it take into account ground levels with respect to sea level nor changes in local barometric pressures during flight. For these reasons, an aviator flying over mountainous country and using a barometrically operated parachute opening device has little assurance of the success of a parachute drop that he may initiate, excepting in situations where the parachute is to be opened at relatively high elevations.

The automatic parachute opening device that is contemplated hereby is designed for making precision determinations of the distance between a falling body to which the parachute is attached, and the ground beneath it during the period of free fall after it is released from an airplane until such time as the parachute is opened by operation of the present device. The present device can be adjusted so that it opens at a definitely established predetermined distance above the surface of the ground toward which it is falling. In the operation of this device the distance determinations are made independently of barometric pressure.

An object of the present invention is therefore to provide an electronically and automatically operated parachute opening device for use in the dropping of supplies, machine guns and the like, from aircraft.

Another object is to provide an automatic parachute opening device that very largely overcomes limitations of previously designed devices used for the same purpose that operate upon the principle of barometric pressures.

Another object is to provide an improved dependable electronic parachute opening device, comprising a circuit and a system of operation that permits an accurate setting for the distance above the ground at which the parachute will be caused to open, by the continuous maintenance of accurate measurements during the free flight of the apparatus prior to the initiation of its operation.

With the above and other objects in view that will be apparent from the following description, illustrative embodiments of the present invention are shown in the accompanying drawings, wherein:

Fig. 1 is a block diagram of a simplified circuit embodying the present invention;

Fig. 2 is a graph diagram indicating the time sequence between a transmitted signal and its received echo as related to the energization of a fired part of the circuit shown in Fig. 1;

Fig. 3 is a block diagram of a modified circuit embodying the present invention;

Fig. 4 is a graph indicating a relationship between signal frequency and elapsed time between signal transmission and echo reception;

Fig. 5 is a schematic circuit diagram embodying the present invention; and

Fig. 6 is a fragmentary modification of a transformer part of the circuit shown in Fig. 5.

There are various ways in which an altitude setting for opening a parachute may be accomplished electronically. One such way is shown in Fig. 1 of the accompanying drawings in which a small radar set is used. The contemplated radar set comprises a pulser 1 that is connected to a transmitter 2, a receiver 3 and a firing circuit 4. The firing circuit 4 contains a thyratron 7, upon the firing of which an explosive charge 5 or squib is detonated and opens the parachute. An antenna 6 serves both the transmitter 2 and the receiver 3.

In the operation of the apparatus shown in the block diagram circuit in Fig. 1 of the drawings, signal is initiated in the pulser 1 and is applied to the transmitter 2, from which it is radiated into space from the antenna 6. Signal transmitted from the antenna 6 to the earth or ground 12 is identified as transmitted signal 10, indicated in Fig. 1 by a dashed line bearing the numeral 10. The transmitted signal 10 strikes the earth or ground 12 and returns to the antenna 6 of the receiver 3 as a signal echo 11. The echo signal 11 so received is ineffective in the firing of the thyratron 7 in the firing circuit 4 until the body in free fall is at a predetermined distance above the earth 12, to which predetermined distance the apparatus has been previously set. The time between transmission and reception of the pulse is the time that it takes for the pulse to reach the ground and come back to the receiver or twice the time it takes the pulse to travel the distance equivalent to the altitude of the parachute above the ground. The predetermined setting of the apparatus establishes the value of $t$, or the time interval in microseconds between the emission of the transmitted pulse 10 and its return to the receiver 3, whereupon the detonation of the squib or explosive charge 5 that opens the parachute occurs. As previously stated, the explosive charge 5 is detonated when the thyratron 7 is caused to fire.

For a further understanding of the synchronization of the parts of the circuit shown in Fig. 1, reference is made to Fig. 2 of the drawings. For each pulse cycle, the pulser 1 accomplishes the functions indicated in Fig. 2. In the diagram there shown, the pulse cycle is indicated by the time $t$ between the letters A and C. In other words the time required for the transmitted pulse to travel twice the actual distance above ground at which the parachute is to open is indicated by the pulse cycle $tAC$ in Fig. 2.

At the time A, a pulse from the transmitter 2 is started and initiates a pulse cycle. Also at the time A, the pulser 1 blanks the receiver 3 so that no signal can be passed through the receiver 3 to the thyratron 7 in the firing circuit 4 at that instant. Simultaneously with the blanking of the receiver 3 by the pulser 1, the pulser also blanks the firing circuit 4 so that the thyratron 7 can not fire at that instant. In other words, at the instant the transmitted signal 10 is initiated, the receiver 3 and the firing circuit 4 are blanked out of circuit.

In Fig. 2 the transmitted pulse 10 leaves the transmitter 2 at the time A. At time B the receiver 3 and firing circuit 4 are unblanked so that the signal echo 11 of the transmitted pulse 10 returning from the ground 12, can be received at the receiver 3.

When the signal echo 11 is so received, the apparatus is within a predetermined distance above the ground. The receiver 3 passes its output to the firing circuit 4 and causes the thyratron 7 to fire. The firing of the thyratron 7 detonates the explosive charge which opens the parachute.

The pulse repetition frequency is not critical but the length of time indicated between the letters B and C in Fig. 2 of the drawings, in which time the receiver 3 and the thyratron 7 in the firing circuit 4 are unblanked, determines the altitude at which the parachute will open. The device can be adjusted by the user so that the time interval BC is such that the parachute will open at the desired predetermined height above the ground.

If the length of transmitted pulse 10 is small or AB is small, greater accuracy can be obtained, and lower altitudes can be measured by the unit than where the transmitted pulse 10, or the time duration AB, is longer. The time between AB and AC is the time within which the return pulse 11 from the ground 12 will operate the detonating circuit. Time AC controls the maximum height at which the firing mechanism will operate and time AB controls the minimum height at which it will operate. For example, if it is desired to open a parachute 1500 feet above ground and no higher, then the receiver 3 would be unblanked for an interval of time not greater than the time required for the transmitted pulse 10 to travel 3000 feet.

A circuit block diagram illustrating a modified means for opening the parachute electronically is shown in Fig. 3 of the drawings. The circuit there shown is somewhat analogous to that used in low altitude altimeters where a radio frequency signal is transmitted continuously. The signal may be a frequency modulated continuous wave. In the use of the circuit shown, radio frequency transmitted signal type, if preferred, is varied in frequency at a given rate so that any reflected energy that is received back at the radio station differs in frequency from the transmitted frequency by the time it takes the signal to reach the ground and return, multiplied by the frequency variation rate, plus or minus any frequency change that is due to doppler effect when the signal is moving toward the reflecting surface, as in the present adaptation.

The block diagram shown in Fig. 3 comprises a transmitter 2' and a receiver 3', with a mixer 22 connected therebetween. An antenna 6' serves both the transmitter 2' and the receiver 3'. The mixer 22 is connected through a filter 23 with a thyratron 7' that is adapted to detonate an explosive charge 5' or squib that serves to open a parachute at a predetermined elevation or altitude. As in the previous adaptation, transmitted signal 10 from the transmitter 2' is radiated in time $$\frac{t}{2}$$

to the ground 12' from which the echo 11 returns to the receiver 3' in time $$\frac{t}{2}$$

The signal, after its transmission from the transmitter 2', is received by the receiver 3' in an overall time $t$.

The initial operation of the system shown in Fig. 3 is substantially analogous to that described for the system shown in Fig. 1, in that a signal 10 transmitted from transmitter 2' is reflected as echo 11 from the ground 12' and is intercepted by the receiver 3'. The echo 11 so received at the receiver 3' is applied thereby to the mixer 22. The mixer 22 mixes signals from the transmitter 2' and from the receiver 3' to provide a beat frequency output that is applied to the filter 23. At the predetermined elevation to which the apparatus is adjusted, the beat frequency output of the mixer 22 is such that it alone passes the filter 23 and causes the thyratron 7' to fire and thereby detonate the explosive charge 5' or squib in the parachute thus causing the parachute to open. The filter 23 arrests the passage of radio energy of frequencies other than the preset beat frequency.

In connection with the block diagram shown in Fig. 3, it will be noted that the signal echo 11 that is intercepted by the receiver 3', will reach the mixer 22 at a time $t$ after the signal of the same intitial frequency was transmitted by the transmitter 2'. Expressed differently, depending upon the time $t$ or the altitude above ground there will be a different frequency in the mixer 22 which will denote altitude, so that, by the use of the filter 23 that is designed to pass a predetermined frequency, the thyratron 7' can be fired at a given altitude. As in the circuit shown in Fig. 1, the thyratron 7' operates to explode the small charge 5' which, in turn, opens the parachute.

The output from the thyratron 7' may be adapted to perform another desired function if preferred, within the scope of the present invention. It is believed further, that with supplied known modifications, the circuits and systems that are outlined herein are applicable to altitude fuses within the scope of the present invention. Preferably the receiver 3 and the firing circuit 4 are incorporated in one small unit. The first circuit and system that is disclosed herein is to be preferred for use with aircraft in that it is highly accurate and would have the advantage of being acceptable in small and light equipment for airborne installations.

A pair of substantially parallel curves 27 and 28 are shown in Fig. 4 of the accompanying drawings, with frequency and time as the coordinates. The full line curve 27 passes through the zero coordinates at an angle of about 35 to 40 degrees with respect to the abscissa and designates the relationship between frequency and time of transmitted frequency modulated continuous wave signal 10 to the mixer 22 in Fig. 3. The full line curve 27 is parallel to a second dashed line curve 28 indicating the relationship between frequency and time of the echo 11 reflected from the ground 12' and received through the receiver 3' at the mixer 22.

The circuit in schematic form shown in Fig. 5 of the accompanying drawings is a presentation of an operative circuit that will accomplish the functions indicated in Fig. 1. In the circuit shown in Fig. 5 an antenna 6" is common to or serves both a transmitter 2" and a receiver 3".

Signal from the transmitter 2" originates at a blocking oscillator 29 that is coupled by a transformer 31 with a radio frequency oscillator 39. The output from the radio frequency oscillator 39 is applied through a tank circuit 43 to the antenna 6".

Returned signal intercepted by the receiver 3" through a tuned circuit 42, is applied to a receiver comprising a video amplifier 44 that has a crystal detector 48 at its input end and that applies its output to a multivibrator or flip-flop circuit 47. The output end of the secondary winding of the transformer 31 in junction with the radio frequency choke coil 40 is connected to the first stage of the video amplifier 44 in the receiver 3". The same junction of the end of the secondary winding of the transformer 31 with the choke coil 40 in the transmitter 2" is connected through a delay line 46 into part of the input into the multivibrator or flip-flop circuit 47.

In the transmitter 2", the blocking oscillator 29 comprises an oscillator tube 30 that receives its plate power input from a B+ power source 100 through a primary winding 45 of the transformer 31. Input in the form of positive pulses to the grid of the tube 30 is supplied through a capacitor 32 from an inductive winding 34 of the transformer 31 coupled with the primary winding 45 thereof. The grid of the tube 30 is applied to ground through resistor 33. The cathode of the tube 30 is grounded directly as shown.

The secondary winding 49 of the transformer 31 may or may not, as preferred, be provided with means for suppressing negative pulse or flywheel action after the positive pulse, as shown in Fig. 6, by means of a diode 75 connected thereacross and with or without, as preferred, a resistor 76 in series with the plate of the diode 75.

The tube 35 in the RF oscillator 39 is heated from a power source 105 through choke coils 101 and 102. The cathode of the tube 35 is returned to ground through the coil 101. The plate and grid of the RF oscillator tube 35 are applied through capacitors 106 and 107, respectively, to a pair of lines 36 that are adjustably tuned by a shorting bar 110. The setting of the shorting bar 110 on the pair of lines 36 determines the RF signal frequency that is applied by the transmitter 2" to the antenna 6" for radiation into space.

The receiver 3" is temporarily blanked while the signal from the transmitter 2" is radiated from the antenna 6" to the earth or ground 12. The returned echo response 11 is then applied to the tuned circuit 42 in the receiver 3" after the receiver is unblanked. Output from the tuned circuit 42 is applied to the crystal rectifier 48 that acts as a detector in the receiver 3".

In the circuit shown in Fig. 5, the crystal rectifier 48 is connected in series with a capacitor 53 in the control grid circuit of the tube 70 to function as a mixer, comparable with the mixer 22 in Fig. 3. The control grid of the tube 70 is returned to ground through resistor 56. The screen grid of the tube 70 is connected with the plate thereof through a resistor 57. The suppressor grid of the tube 70 is connected with the cathode thereof and applied to ground through a resistor 38. The cathode of the tube 70 is connected with the secondary winding 49 of the transformer 31 at its junction with the choke coil 40 in the transmitter 2".

Tubes 70 and 71 in the receiver 3" are interconnected to provide a video amplifier at the input end of the receiver. The plate of the tube 70 is connected through a capacitor 58 with the control grid of the tube 71 that is returned to ground through a resistor 62. The screen grid of the tube 71 is connected to the plate thereof through a resistor 63 and to the plate of the tube 70 through the resistor 57. The suppressor grid of the tube 71 is connected to the cathode thereof and is applied to ground through a resistor 64 shunted by a capacitor 66. The plates of the tubes 70 and 71 are connected through the resistors 57 and 63, respectively, in series to a power supply 69.

The output from the plate of the tube 71 is connected through a capacitor 78 to the grid of section D of tube 65 of the flip-flop circuit 47. The plates of sections A and B of duo-triode tube 50 are connected through resistors 61 and 55, respectively, to the plate power supply 69. Input into the grid of the section A of the tube 50 originates at the junction of the transformer secondary winding 49 and the RF choke coil 40 in the transmitter 2" and is passed through a delay line 46 in series with a capacitor 54 in the receiver 3".

The delay line 46 comprises a desired plurality of series connected inductors 81, 82, 83, 84, 85 and 86 that are applied through a resistor 87 to ground. The inductors 81, 82, 83, 84 and 85 are grounded through the capacitors 91, 92, 93, 94 and 95, respectively, at their ends remote from the connection of inductor 81 with the RF choke coil 40 in the transmitter 2".

Within the flip-flop circuit 47, section A of the duo-triode tube 50 has its grid grounded through a resistor 59. The plate of the section A of the tube 50 is connected through capacitor 60 with the grid of section B of the tube 50. The grid of section B of the tube 50 is connected through a distance setting variable resistor 51 to the common junction of the cathodes of the two tube sections A and B and through a resistor 52 to ground. The variable resistor 51 may be set to fire the squib or powder charge 5'' in the parachute at a desired predetermined distance above ground. The junction of the resistors 55 and 61 in the plate circuit of the tube 50 is joined through an RF choke coil 79 which also acts as a relay coil to a common junction of the plates of sections C and D of the duo-triode tube 65 in the flip-flop circuit 47. The choke coil 79, in acting as a relay coil, when energized closes a pair of squib firing contacts 77 that detonate the squib or powder charge 5'' to open the parachute at a predetermined distance above the earth or ground depending upon the setting of the tap of the adjustable resistor 51.

The junction of the plate of section B of the tube 50 and the resistor 55 is connected through a capacitor 67 to the grid of section C of the tube 65. The grid of section C of the tube 65 is applied to ground through a resistor 68. The grid of section D of tube 65 is connected with and hence receives the output from the plate of the tube 71 through a capacitor 78, as stated previously. The grid of section D of the tube 65 is applied to ground through the resistors 72 and 73 connected in series. The cathodes of sections C and D of the tube 65 are connected from a common junction through resistors 74 and 73 to ground.

Operatively, signal originates at the tube 30 in the blocking oscillator 29, which applies positive pulses inductively through the transformer 31 to the plate of the tube 35 in the RF oscillator 39. The pulsed potential differential so applied across the pairs of tuned lines 36 induces RF potential surges in the antenna coupling loop 111 that are radiated as transmitted signal from the antenna 6''.

Simultaneously with the radiation of transmitted signal from the transmitter 2'', the receiver 3'' is blanked temporarily by the application of a positive pulse to the cathode of the tube 70 in the video amplifier 44. The same positive pulse from the same point source passes through the delay line 46 to the grid of section A of the tube 50 in the flip-flop circuit 47. In this manner the receiver 3'' is blanked during the sending of the transmitted signal 10 and is unblanked immediately thereafter for the reception of the echo pulse 11 returned from the ground 12. The closing of the pair of contacts 77 upon the resultant energization of the relay winding 79 is applied through the firing circuit 4'' for causing the detonation of the squib or explosive charge 5'' which opens the parachute at a distance above the earth 12 determined by the setting of the movable tap on the adjustable resistor 51.

By means of the circuit shown in Fig. 5 of the accompanying drawings a parachute may be made to open automatically at a preset height above the ground regardless of the height of the ground above sea level. In the circuit shown in Fig. 5 the tube 30 is used in a single swing, blocking oscillator circuit 29 as a pulse generator running freely. There are two characteristics which distinguishes the oscillator 29 from a radio frequency blocking oscillator. First, its fundamental frequency is usually within the audio rather than within the radio frequency spectrum; and second, an excessively long time constant is used in its grid circuit to cause it to cut off or block after only one cycle of operation.

The blocking oscillator circuit 29 consists of the oscillator tube 30 with a capacitor 32 in series with its grid and with its grid coupled with its plate through winding 34 of the transformer 31. The tube grid is returned to ground through the resistor 33. The transformer 31, which couples the tube plate to the grid circuit of the tube 30 by transformer winding 34 must offer nearly perfect coupling and display rather high losses.

The action of the blocking oscillator circuit 29 is as follows: The grid condenser 32 is charged negatively by a preceding cycle of operation and it discharges through the resistor 33. The grid of the tube 30 thereupon becomes less and less negative until it reaches cut off at which time the tube 30 starts to conduct. Plate current flowing through the primary winding of the transformer 31 induces a voltage in the transformer grid winding 34 which makes the grid of the tube 30 less negative and thereby allows more plate current to flow. This in turn induces an increase in positive voltage upon the grid of the tube 30. In this manner cumulative action takes place which subsides when the grid of the tube 30 actually becomes positive with respect to the cathode of the tube. As soon as the plate current ceases to rise, at which time a balance is arrived at in the positive potential charge upon the plate and grid of the tube 30, the grid begins to become less positive, causing less plate current to flow which in turn induces a voltage through the transformer 31 depressing the grid of the tube 30 still further. This process continues until the grid is driven to cut off, thus completing a cycle of operation for the tube 30. Oscillation does not start again immediately, however, because the grid current flow, when the tube grid was positive, built up sufficient charge upon the grid condenser 32 to maintain cut off until it leaks off through the grid resistor 33. The time interval consumed by each rise and decay of plate current is determined by the values of the resistor 33 and the capacitor 32. The transformer 31 should have rather high losses in order to damp any small oscillations following the main pulse due to flywheel action.

A positive pulse thus obtained at the output of the transformer 31 is used for three purposes. First, to pulse the radio frequency oscillator 39, next, to block the receiver circuit 3'', and lastly, to set up a timing circuit which controls the altitude of operation.

RF oscillator tube 35 is used in a standard RF oscillator circuit 39 which, due to its frequency of operation, makes use of shorted parallel lines 36 in the oscillator tank circuit 43 to determine the RF frequency. The plate voltage of the RF oscillator tube 35, when it is not being pulsed, is substantially zero because it is obtained from a voltage divider comprising the resistor 37 across the transformer 31 and the resistor 38 between the cathode of the amplifier tube 70 and ground. The resistor 38 is of very small value as compared with the resistor 37. Therefore tube 35 is not oscillating when it is not pulsed due to the deficiency of its plate voltage. Hence, when the positive pulse of voltage from the transformer 31 is applied to the tube 35 through the radio frequency choke coil 40, the tube 35 breaks into oscillation at a frequency that is determined by the tank circuit 43. Since the pulse applied to the plate of the oscillator tube 35 is very short in time duration, the burst of radio frequency power that reaches the antenna 6'' through the coupling RF choke coil 40 is very short.

When this burst of radio frequency power goes out to the antenna 6'', it also goes through the tuned circuit 42 to the crystal detector 48 and would operate the receiver 3'' if it were not for the fact that the positive pulse which is applied to the radio frequency oscillator 39 is also applied to the cathode of the video amplifier tube 70 across the resistor 38 in the first video stage in the receiver, thus blocking momentarily the operation of the receiver. As an additional precaution, the positive pulse is also applied to the delay line 46 as indicated, which delays the pulse for a sufficient length of time equivalent to one pulse width before it is applied to the grid of the single kick oscillator or flip-flop circuit 47.

The flip-flop circuit 47 in the dormant stage has no grid bias applied on the side B of the duo-triode tube 50 and the grid is returned to the cathode through the adjustable resistor 51. The grid therefore is at the same potential as the cathode, allowing the tube 50 to conduct quite heavily. The plate current from the tube 50 flows through resistor 52 causing a large voltage drop across the resistor 52 which cuts off the side A of the tube 50. This then is the static condition when the positive pulse from the delay line 46 arrives at the grid of the tube side A through the capacitor 54.

With the side A of the tube 50 cut off, the voltage at its plate with respect to ground is the full supply voltage. The voltage at the plate of the tube side B is much lower than that at the plate of tube side A due to its heavy conduction and consequent IR drop across the resistor 55. Since the voltage at the plate of tube side A tends to be the full supply voltage, the capacitor 60 will be charged up to that potential with the resistor 52, which is the grid-cathode path of tube side B and resistor 61. The positive pulse applied to the grid of tube side A removes the negative potential from the grid of the same tube side and drives that tube side into conduction. The instant that tube side A goes into conduction, its plate voltage drops from full supply voltage to a considerably lower level. As capacitor 60 is charged to a higher level, it tends to discharge to the new level that is present at the plate of tube side A. Since its discharge path consists of the low resistance cathode path of tube side A and the high grid resistance of tube side B, it cannot change its charge immediately and therefore the entire change of voltage between the cathode and the plate of tube side A appears instantaneously at the grid of tube side B across the adjustable resistor 51. This drives the grid of the tube side B from a zero voltage with respect to its cathode to a new negative value thereby greatly reducing its plate current flow.

The reduction in the plate current flow of tube side B decreases the IR drop across the resistor 52 thus reducing the grid-to-cathode voltage of the tube side A and results in a still heavier plate current flow through the tube side A and a still greater drop in its plate potential.

This cumulative process continues until tube side B is cut off and tube side A is conducting heavily. This happens in a very short period of time after the impression of the triggering pulse. The voltages of the plates of the two tube sides B and A have switched to new levels and will remain so as long as tube side B is cut off.

Since the voltage at the plate of tube side B has risen to the B+ value and its plate current stopped, it can have no further effect upon the tube side A by way of the common cathode coupling as long as it is cut off. This condition will not remain indefinitely since tube side B is maintained in a blocked condition by the charge upon the condenser 60. As soon as the discharge current of capacitor 60 decays to such a value that the IR drop produced across the resistor 51 is no longer sufficient to maintain the tube side B at cut off, this condition is terminated.

As the tube side B goes into conduction again, the additional current drawn through resistor 52 renders the cathode of tube side A more positive with respect to ground, which has the same effect as making the grid more negative with respect to its cathode.

This results in an abrupt decrease in plate current through tube side A and consequently an increase in its plate voltage. Capacitor 60 now tends to charge up to this new level. This causes the grid of tube side B to become positive with respect to its cathode, greatly increasing its plate current flow, which produces a much larger voltage drop across resistor 52. The increase in the cathode voltage of the tube side A causes its plate current to decay further, resulting in a higher voltage at its plate. The capacitor 60 charges rapidly to this new level through the low resistance, cathode-grid path of the tube side A.

The negative action under way in a very short period of time restores the tube side A to its original cut off state and places the tube side B in a state of heavy conduction. Circuit voltages are now stabilized at the original static conditions and will remain there until the circuit is again triggered by the arrival of a positive pulse at the grid of tube side A. The width of the plate waveforms may be varied over a wide range by changing the value of the adjustable resistor 51 which alters the resistance-capacitance time constant of the discharge path of the capacitor 60, controlling the period of time that tube side B is cut off. It will be seen therefore that each time a pulse is transmitted by the radio frequency oscillator 39, the flip-flop circuit 47 is flipped one pulse width later. In other words, the grid of the tube side C of tube 65 receives a positive pulse, the duration of which can be controlled by the setting of resistor 51 which determines the time that the flip-flop circuit 47 will take to flop back to the static condition after it has been flipped. During this position pulse, the current flowing in the plate circuit of tube side C of tube 65 is increased to a value just short of operating the relay in the plate circuit by energizing the choke coil 79 to close the contacts 77 and fire the squib or powder charge 5'' in the firing circuit 4''.

The radio frequency pulse 10 transmitted by the transmitter 2'' is reflected from the ground 12 and is received by the same antenna 6'' a short time later, the time depending upon the distance between the transmitter and the ground. The reflected pulse 11 is detected by the crystal detector 48 and is fed into a video amplifier 44 consisting of tubes 70 and 71 which are unblocked. The amplified signal is fed to the grid of tube side D of duo-triode tube 65 through capacitor 78. This signal will increase the current in the plate circuit of tube side D so that the relay will operate to close the squib contacts 77 if both the signal on the grid of tube side D and the positive pulse on the grid of tube side C are present at the same time. Tube sides C and D are so operated that it requires positive signals on both grids of the double tube 65 to operate the relay. The closing of the relay contacts 77 will fire a squib or powder charge 5'' to open the parachute. The relay can be replaced by a circuit employing a thyratron which would fire the squib, as previously described, within the scope of the present invention.

In addition to the above and as shown in Fig. 6, and previously mentioned a diode tube 75 may, if desired, be connected across the secondary winding 49 of the transformer 31 for the purpose of suppressing any negative pulse or flywheel action after the positive pulse. A resistor 76 preferably is connected in series with the tube 75 to limit the current conducted thereby.

The radio frequency oscillator frequency that is employed is one than can keep the equipment small so that it does not burden the parachute unnecessarily. The antenna 6" may be incorporated into the harness of the parachute within the scope of the present invention. Preferably also, a tuned radio frequency circuit 42 is employed before the crystal rectifier 48 to discriminate against other frequencies than its own.

The pulse repetition frequency rate is limited by the maximum altitude of operation of the equipment. In other words, a pulse repetition frequency rate of 1000 will allow operation up to 490,000 feet whereas a pulse repetition frequency rate of 10,000 will allow operation up to 49,000 feet. In other words, the time interval between the two consecutive pulses will allow the travel of radio waves for twice these distances or down to earth and return up to the equipment. A pulse repetition frequency rate should be chosen in any case so that a reflection of one pulse will not return after a succeeding transmitted pulse in sufficient strength to operate the circuit and open the parachute prematurely. A pulse repetition frequency rate of 1000 has been found to be satisfactory.

It has been found that the circuit will not operate unless tube side C is conducting. Tube side C conducts immediately after each outgoing pulse for a duration of time that is controlled by the position of the variable tap on the resistor 51. It follows that the circuit will be triggered by a reflected pulse at any time starting immediately after the outgoing pulse up to the time when the tube side B is again conducting heavily. Thus the longer that the tube side C is conducting, the higher the altitude above ground at which the circuit will operate to open the parachute. The adjustment of the tap upon the resistor 51 may be used therefore as an altitude control and the variable resistor 51 may be calibrated in feet if preferred, so that it is, in effect, a direct reading instrument adapted for being set for the parachute to open at a predetermined distance above the earth. The parachute altitude knob then can be set at any altitude above ground that is desired for operation. If the height of the parachute is above this altitude, it will not operate until it descends to the preset altitude. If the parachute is below the preset altitude, it will open. In other words, the circuit has an outside distance limit but will operate anywhere within that distance The circuit for use in airborne installations employs a small battery pack employing a dry charged, wet cell similar to that used in VT fuses. The dimensions of such an electric cell are approximately 2 x 4 x 4 inches, occupying 32 cubic inches. The electrolyte for the cell is contained in a glass vial in the battery case in such a manner that it will be broken just prior to the ejection of the parachute and pack from the airplane. Several seconds are required for the tube filaments in the circuit to warm up to an operative temperature which serves as a safety factor against the operation of the device too close to the aircraft from which it is ejected.

The actual circuit can be built using subminiature tubes with the possible exception of possibly one or two of the tubes, and using relatively small components, so that it may be attached easily to a parachute without adding objectionable weight or bulk. The actual opening mechanism of the parachute may be the same as that used with the barometric type of parachute openers, such as a small charge, or the like.

It is to be understood that the electronically actuated parachute opener circuits that are shown and described herein have been submitted for the purpose of disclosing an operative embodiment of the present invention and that additional similarly functioning alterations and modifications may be made therein without departing from the scope of the present invention.

What I claim is:

1. A pulse-echo system, comprising a transmitter blocking oscillator within which pulses to be transmitted originate, a transmitter radio frequency oscillator inductively coupled with said blocking oscillator, a receiver video amplifier tube having a cathode connected to between said radio frequency oscillator and its inductive coupling with said blocking oscillator for blanking said video amplifier tube from operation upon the passage of a pulse therebetween, a receiver multivibrator connected across said video amplifier for the reception of echo signal therefrom, a delay line connected between said radio frequency oscillator and said multivibrator to initiate signal reception following the blanking of said video amplifier tube, and multivibrator variable adjustable means permitting an output from said multivibrator upon the coincidence of conduction through said delay line and through said video amplifier.

2. An adjustable device of the character described adapted for opening a parachute at a predetermined distance above ground, comprising signal producing means, transmitter means for transmitting signal in the direction of the ground, a receiver for receiving a ground reflected echo of the signal from said transmitter means and containing an amplifier having a mixer tube with a cathode to which signal from said signal producing means is applied for temporarily blocking said receiver during the transmission of signal, a delay line in said receiver and to an end of which signal from said signal producing means is applied, a flip-flop circuit in said receiver and containing two duo-triode vacuum tubes to the control grid of a first side of a first duo-triode tube of which the output from said delay line is applied for impressing the delayed signal from said signal producing means thereon and to the control grid of a second side of a second duo-triode tube of which the ground reflected echo of the signal from said transmitter means conducted through said amplifier is applied, a flip-flop circuit first capacitor connected between the plate of first side of said first duo-triode tube and the control grid of the second side of said first duo-triode tube, an adjustable resistor means connected between the control grid of the second side of said first duo-triode tube and both cathodes of said first duo-triode tube and ajustable for presetting the distance above ground at which the parachute will be opened, a flip-flop circuit second capacitor connected between the plate of the second side of the first duo-triode tube and the control grid of the first side of the second duo-triode tube, a flip-flop circuit relay winding connecting the two plates of the second duo-triode tube with a source of power supply, a pair of relay contacts closed only by the simultaneous impression of amplified echo signal on the control grid of the second side of the second duo-triode tube in said flip-flop circuit and a positive pulse impressed upon the control grid of the first side of the second duo-triode tube in said flip-flop circuit, and means actuated by the closing of said pair of relay contacts for opening the parachute at the distance above ground established by the setting of the adjustable resistor between the control grid and the cathode of the second side of said first duo-triode tube in said flip-flop circuit.

3. An unattended parachute opener using a pulse-echo system, comprising a pulse transmitting means, pulse receiving means blocked during transmission between receptions of ground reflected signal echo pulses, a delay line, a flip-flop circuit first duo-triode tube to a first side of which pulse is applied through said delay line, a flip-flop circuit second duo-triode tube to a second side of which echo initiated pulse is applied and said flip-flop circuit second duo-triode tube conducting only on the coincidence of received pulses on both sides of said second duo-triode tube, a distance calibrated adjustable resistor connected between the grid and the cathode of the second side of said first duo-triode tube for presetting the parachute opener, and means opening the parachute in response to the conduction simultaneously of both sides of said second duo-triode tube in said flip-flop circuit.

4. An unattended parachute opener using a pulse-echo system, comprising a blocking oscillator means supplying pulse signal, signal transmitting means deriving its signal from said blocking oscillator means, signal receiving means blocked during transmission and between receptions of ground reflected signal echo pulses, a delay line to which signal from said signal transmitting means is passed, a flip-flop circuit first duo-triode tube in said signal receiving means and having a first control grid to which output from said delay line is applied and having a second control grid and a cathode, a distance calibrated adjustable resistor connected between the second control grid and the cathode of said first duo-triode tube, a flip-flop circuit second duo-triode having a first side control grid to which output from said first duo-triode tube second side is applied and having a second side control grid to which ground reflected signal echoes are applied, and means actuated by the conduction simultaneously of both of said pair of flip-flop circuit duo-triodes for causing the parachute to open.

5. An unattended parachute opener using a pulse-echo system, comprising a blocking oscillator supplying pulse signal, transformer means having a primary winding through which a positive voltage is supplied to said blocking oscillator and having a secondary winding inductively coupled with said primary winding, a diode tube connected across said transformer secondary winding, a first resistor means connected across said transformer primary and secondary windings, a second resistor means connected in series with said diode tube across said transformer secondary winding, means for transmitting pulse signal derived from said blocking oscillator through said transformer means, echo pulse signal receiver means, mixer means in said echo pulse signal receiver means and blocked temporarily by the transmitted signal pending the arrival of the second echo pulse signal, a first duo-triode tube in said receiver means and having a first side with a control grid and plate and cathode and a second side with a control grid and plate and cathode, a delay line connected between the output from said transformer secondary winding and the control grid on the first side of said first duo-triode tube, an adjustable third resistor connected between said first duo-triode second side control grid and cathode, second duo-triode tube having a first side with a control grid and plate and cathode and a second side with a control grid and plate and cathode and to the second side control grid of which the output from said echo pulse signal receiving means is applied, a first capacitor means coupling said echo pulse signal receiving means mixer means output with said second duo-triode second side control grid, a second capacitor means coupling said delay line with said first duo-triode first side control grid, a third capacitor means coupling said first duo-triode first side plate with said first duo-triode second side control grid, a fourth capacitor means coupling said first duo-triode second side plate with said second duo-triode first side control grid, a power supply for supplying power to said first and second duo-triode plate electrodes, a relay winding connected between said second duo-triode plate electrodes and said power supply, an explosive squib for opening the parachute, and a pair of squib firing contacts closed only on the simultaneous conduction of both sides of said second duo-triode tube with the resulting energization of said relay winding in the plate circuit of said second duo-triode tube.

HARRY VANTINE, JR.

REFERENCES CITED

The following references are of record in the file of this patent:

UNITED STATES PATENTS

| Number | Name | Date |
|---|---|---|
| 2,395,928 | Willoughby | Mar. 5, 1946 |
| 2,403,527 | Hershberger | July 9, 1946 |
| 2,419,566 | Labin | Apr. 29, 1947 |
| 2,422,382 | Winchel | June 17, 1947 |

FOREIGN PATENTS

| Number | Country | Date |
|---|---|---|
| 263,588 | Great Britain | Jan. 6, 1927 |

OTHER REFERENCES

Electronics for December 1945, pages 98 to 103.